(12) United States Patent
Pickett et al.

(10) Patent No.: US 9,141,562 B2
(45) Date of Patent: Sep. 22, 2015

(54) AUTOMATED BEVERAGE DISPENSING SYSTEM WITH CUP LIDDING AND BEVERAGE IDENTIFICATION

(71) Applicant: The Coca-Cola Company, Atlanta, GA (US)

(72) Inventors: Sean Pickett, Riddells Creek (AU); Kenneth Andrew Nicoll, Doncaster (AU); Mark David Rob, East Bentleigh (AU); Andrew Mark Angus, Pearcedale (AU); Mark Brian Dockrill, Chadstone (AU); Ravisha Sellahewa, South Yarra (AU); Stephen Houghton, Vermont South (AU); Scott Alexander Anderson, Melbourne (AU)

(73) Assignee: The Coca-Cola Company, Atlanta, GA (US)

( * ) Notice: Subject to any disclaimer, the term of this patent is extended or adjusted under 35 U.S.C. 154(b) by 229 days.

(21) Appl. No.: 13/778,313

(22) Filed: Feb. 27, 2013

(65) Prior Publication Data

US 2013/0226338 A1    Aug. 29, 2013

Related U.S. Application Data

(60) Provisional application No. 61/603,404, filed on Feb. 27, 2012.

(51) Int. Cl.
*G07F 13/10* (2006.01)
*G06F 13/10* (2006.01)
*B65B 7/28* (2006.01)

(52) U.S. Cl.
CPC . *G06F 13/10* (2013.01); *B65B 7/28* (2013.01); *B65B 7/2807* (2013.01); *B67D 2210/00076* (2013.01); *B67D 2210/00078* (2013.01)

(58) Field of Classification Search
CPC .......... B65G 59/106; B67D 1/00; B67D 1/06; B67D 2210/00076; B65B 7/28; B65B 7/2807; G07F 13/10
See application file for complete search history.

(56) References Cited

U.S. PATENT DOCUMENTS

| 489,753 A | 1/1893 | McGilvra |
| 2,237,189 A | 4/1941 | McCormack et al. |
| 2,517,532 A | 8/1950 | Carew et al. |
| 3,530,907 A | 9/1970 | Slass |
| 3,610,482 A | 10/1971 | Steenburgh, Jr. |
| 3,915,207 A | 10/1975 | Greenvield, Jr. et al. |
| 4,184,523 A | 1/1980 | Carrigan et al. |
| 4,248,276 A | 2/1981 | Gosnell |
| 4,319,441 A | 3/1982 | Credle |
| 4,590,975 A | 5/1986 | Credle, Jr. |
| 4,694,661 A | 9/1987 | Landers |

(Continued)

FOREIGN PATENT DOCUMENTS

| DE | 31 11 896 C1 | 12/1982 |
| EP | 0 018 733 B1 | 4/1984 |
| EP | 0 460 522 A1 | 12/1991 |

*Primary Examiner* — Timothy Waggoner
(74) *Attorney, Agent, or Firm* — Sutherland Asbill & Brennan LLP

(57) ABSTRACT

The present application provides an automated beverage dispenser using a number of cups and a number of lids. The automated beverage dispenser may include a lid stack with the number of lids, a lidding mechanism, and a positioning device for maneuvering the lidding mechanism so as to remove one of the number of lids from the lid stack and to attach the lid to one of the number of cups.

23 Claims, 13 Drawing Sheets

(56) References Cited

U.S. PATENT DOCUMENTS

| | | | |
|---|---|---|---|
| 4,917,155 A | 4/1990 | Koblasz et al. | |
| 4,944,337 A | 7/1990 | Credle, Jr. et al. | |
| 4,946,073 A | 8/1990 | Brill et al. | |
| 4,949,526 A * | 8/1990 | Brogna et al. | 221/268 |
| 4,964,542 A | 10/1990 | Smith | |
| 5,000,345 A | 3/1991 | Brogna et al. | |
| 5,058,630 A | 10/1991 | Wiley et al. | |
| 5,058,773 A | 10/1991 | Brill et al. | |
| 5,074,341 A | 12/1991 | Credle, Jr. et al. | |
| 5,105,859 A | 4/1992 | Bennett et al. | |
| 5,219,008 A | 6/1993 | Shannon | |
| 5,230,448 A | 7/1993 | Strohmeyer et al. | |
| 5,267,672 A | 12/1993 | Jacobsen et al. | |
| 5,299,716 A | 4/1994 | Hawkins et al. | |
| 5,350,082 A | 9/1994 | Kiriakides, Jr. et al. | |
| 5,413,249 A | 5/1995 | Chigira | |
| 5,974,823 A | 11/1999 | Banno et al. | |
| 6,039,220 A | 3/2000 | Jablonski et al. | |
| 6,053,359 A * | 4/2000 | Goulet et al. | 221/221 |
| 6,194,013 B1 | 2/2001 | Kolar et al. | |
| 6,276,517 B1 | 8/2001 | Peterson et al. | |
| 6,301,908 B1 | 10/2001 | Huffman et al. | |
| 6,607,013 B1 | 8/2003 | Leoni | |
| 6,761,036 B2 | 7/2004 | Teague et al. | |
| 6,827,529 B1 | 12/2004 | Berge et al. | |
| 7,575,185 B2 | 8/2009 | Hammonds et al. | |
| 7,578,415 B2 | 8/2009 | Ziesel et al. | |
| 7,757,896 B2 | 7/2010 | Carpenter et al. | |
| 7,866,509 B2 | 1/2011 | Ziesel | |
| 7,882,980 B1 | 2/2011 | Horn et al. | |
| 2001/0025861 A1 | 10/2001 | Jaleel et al. | |
| 2001/0038017 A1 | 11/2001 | Davis | |
| 2002/0020711 A1 | 2/2002 | Glass et al. | |
| 2006/0027598 A1 | 2/2006 | Ubidia et al. | |
| 2006/0169721 A1 | 8/2006 | Hammonds et al. | |
| 2007/0106422 A1 | 5/2007 | Jennings et al. | |
| 2010/0314407 A1 | 12/2010 | Nevarez et al. | |
| 2011/0041542 A1 | 2/2011 | Brunner et al. | |
| 2011/0049180 A1 | 3/2011 | Carpenter et al. | |
| 2011/0049190 A1 | 3/2011 | Seveik et al. | |
| 2011/0189358 A1 | 8/2011 | Herbert | |
| 2011/0220689 A1 | 9/2011 | Njaastad et al. | |
| 2011/0260828 A1 | 10/2011 | Zhang et al. | |
| 2013/0074980 A1 | 3/2013 | Crane et al. | |
| 2013/0075419 A1 | 3/2013 | Crane et al. | |
| 2013/0075426 A1 | 3/2013 | Crane et al. | |

* cited by examiner

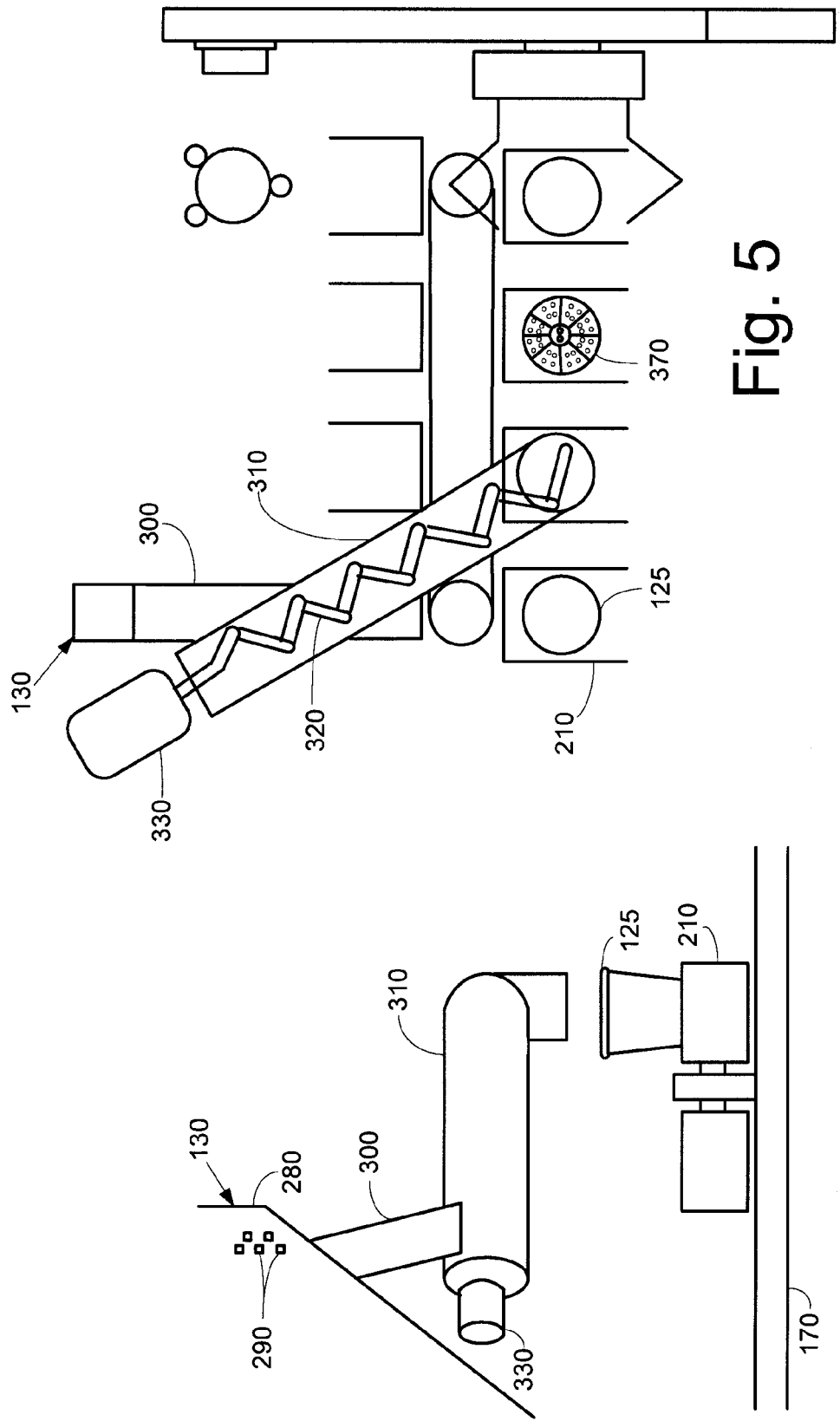

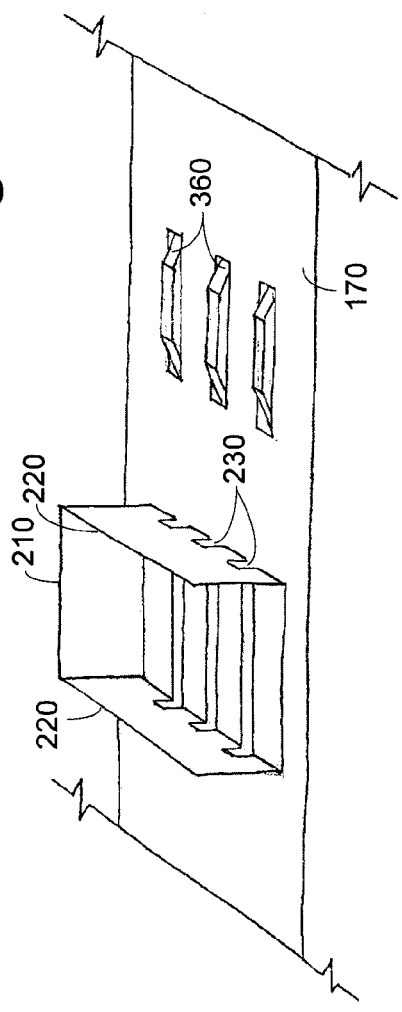
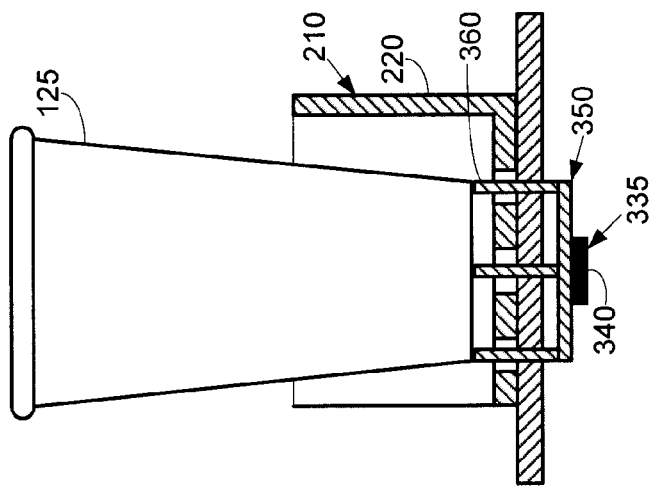

| Foam Level: | | 1 | 2 | 3 | 4 | 5 | 6 |
|---|---|---|---|---|---|---|---|
| No Ice | Fills | 1 | 2 | 2 | 2 | 3 | 3 |
| | % fill | 100 | 80 | 75 | 70 | 60 | 60 |
| | Wait between fills | 0 | 5.5 | 6 | 10 | 15 | 20 |
| | Wait after last fill | 0 | 0 | 0 | 0 | 3 | 5 |
| Low Ice | Fills | 1 | 2 | 2 | 2 | 3 | 3 |
| | % fill | 100 | 85 | 78 | 75 | 70 | 65 |
| | Wait between fills | 0 | 4.5 | 5 | 8 | 12 | 18 |
| | Wait after last fill | 0 | 0 | 0 | 0 | 2 | 4 |
| Med. Ice | Fills | 1 | 2 | 2 | 2 | 3 | 3 |
| | % fill | 100 | 88 | 81 | 78 | 75 | 70 |
| | Wait between fills | 0 | 4 | 4.5 | 5 | 9 | 15 |
| | Wait after last fill | 0 | 0 | 0 | 0 | 0 | 3 |
| Heavy Ice | Fills | 1 | 1 | 2 | 2 | 2 | 3 |
| | % fill | 100 | 91 | 86 | 82 | 78 | 72 |
| | Wait between fills | 0 | 3 | 3.5 | 4 | 7 | 12 |
| | Wait after last fill | 0 | 0 | 0 | 0 | 0 | 3 |

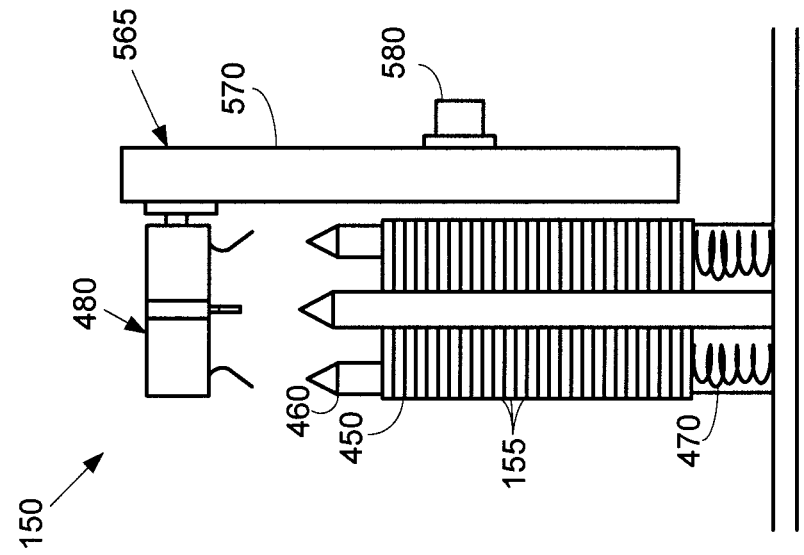
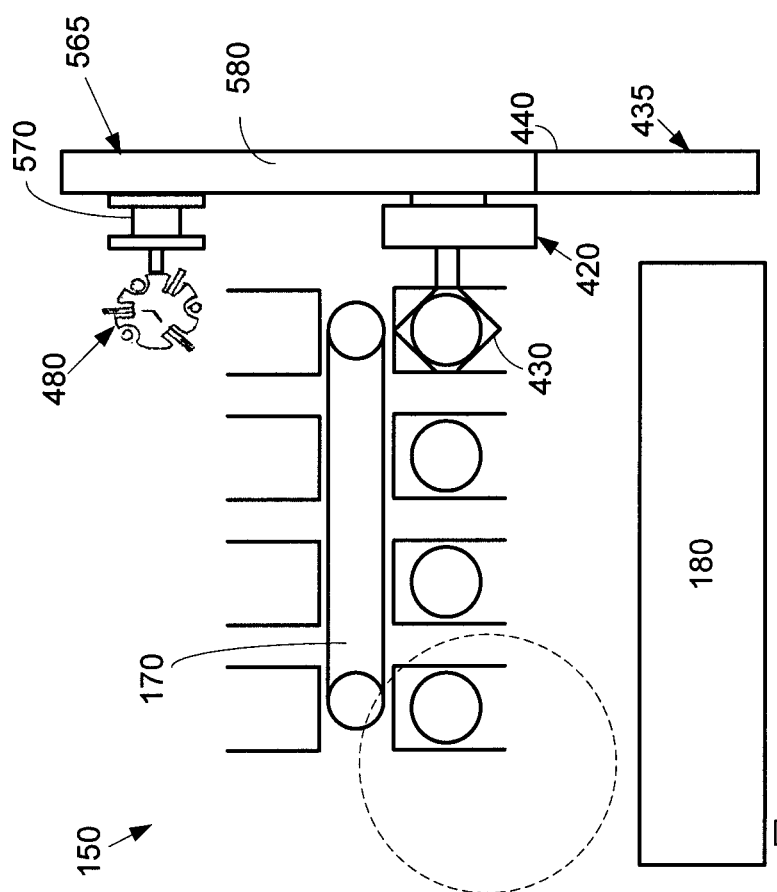
Fig. 10
Fig. 9

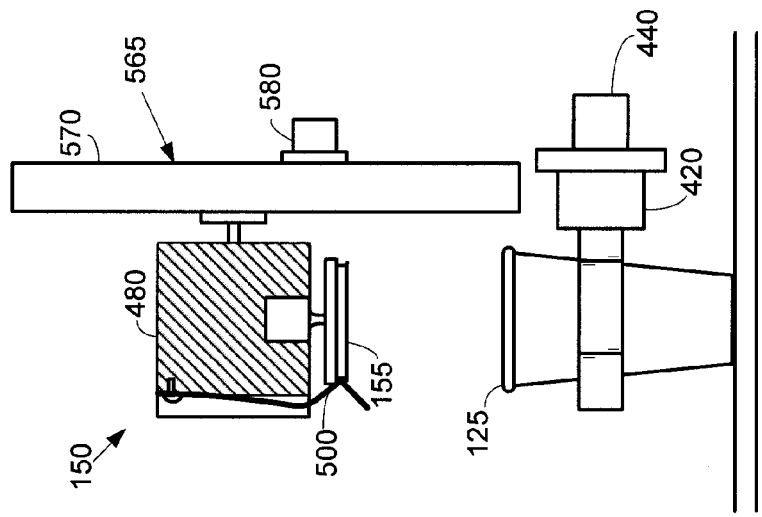
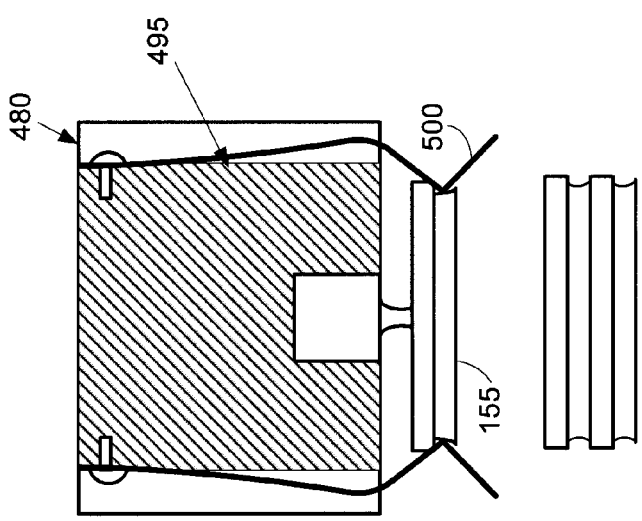
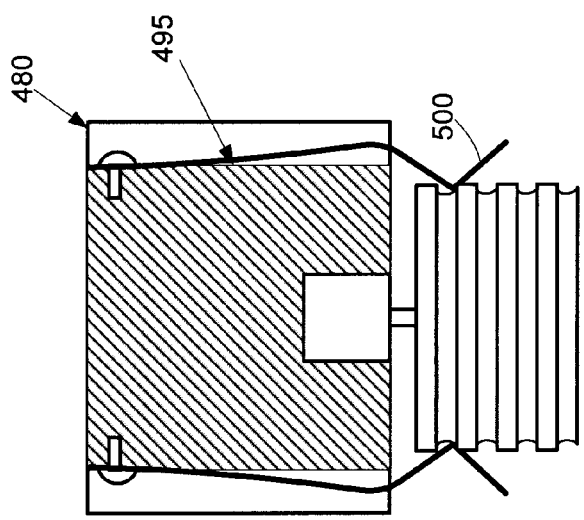

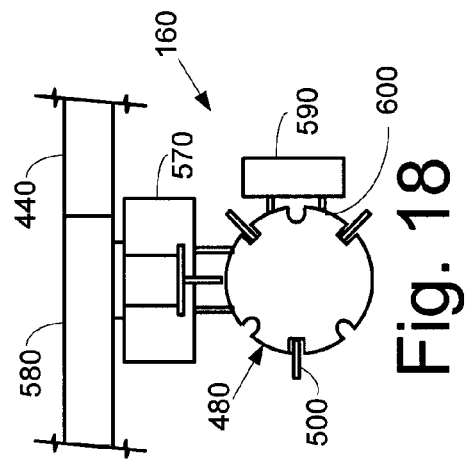
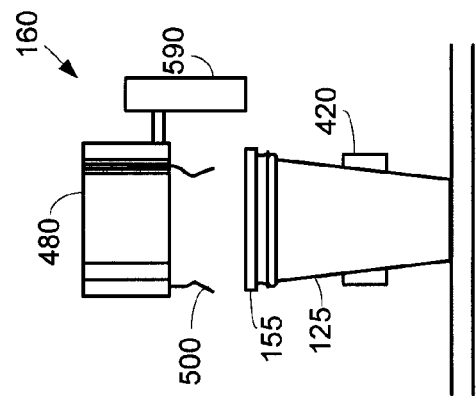
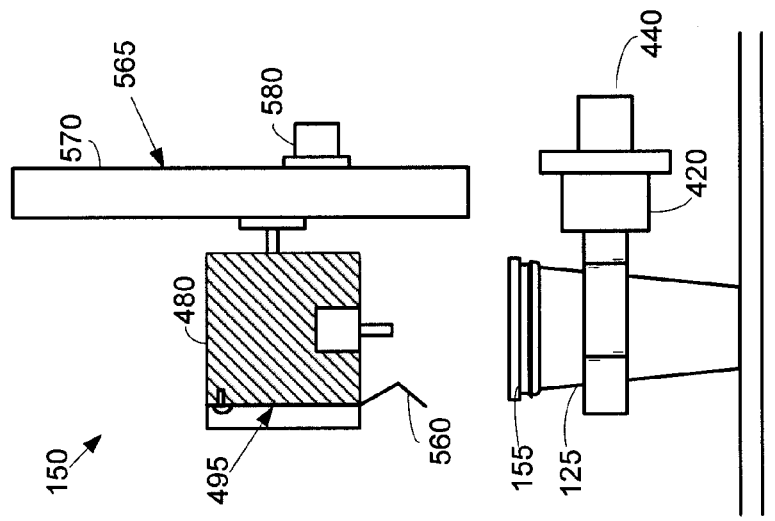
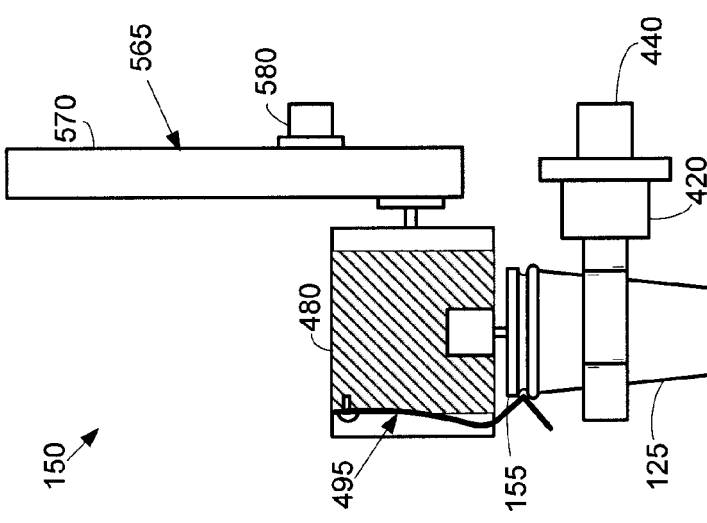

AUTOMATED BEVERAGE DISPENSING SYSTEM WITH CUP LIDDING AND BEVERAGE IDENTIFICATION

RELATED APPLICATIONS

The present application is a non-provisional application claiming priority to U.S. Provisional Patent Application No. 61/603,404, filed on Feb. 27, 2012. U.S. Provisional Patent Application No. 61/603,404 is incorporated herein by reference in full.

TECHNICAL FIELD

The present application and the resultant patent relate generally to beverage dispensing systems and more particularly relate to an automated beverage dispensing system with cup lidding and beverage identification stations for fast and efficient service.

BACKGROUND OF THE INVENTION

Beverage dispensers traditionally combine a diluent such as water with a beverage base such as a syrup and the like. These beverage bases generally have a dilution or a reconstitution ratio of about three to one (3:1) to about six to one (6:1). The beverage bases usually come in large bag-in-box containers that require significant amounts of storage space and may need to be refrigerated. These storage requirements often necessitate the need to position these bag-in-box containers away from the dispenser in a backroom with a long supply line. Each bag-in-box container usually only holds a beverage base for a single type or flavor of beverage such that multiple bag-in-box containers may be required to provide the consumer with a variety of beverage options.

Resent improvements in beverage dispensing technology have focused on the use of micro-ingredients. With micro-ingredients, the traditional beverage bases may be separated into their constituent parts at much higher reconstitution ratios. These micro-ingredients then may be stored in much smaller packages and stored closer to, adjacent to, or within the beverage dispenser itself. The beverage dispenser preferably may provide the consumer with multiple beverage options as well as the ability to customize his or her beverage as desired.

Beverage dispensers incorporating such highly concentrated micro-ingredients have proven to be highly popular with consumers. One example of the use of such micro-ingredients is shown in commonly owned U.S. Pat. No. 7,757,896 B2 to Carpenter, et al., entitled "BEVERAGE DISPENSING SYSTEM." U.S. Pat. No. 7,757,896 B2 is incorporated herein by reference herein in full. Likewise, such micro-ingredient technology is incorporated in the highly popular "FREESTYLE®" refrigerated beverage dispensing units provided by The Coca-Cola Company of Atlanta, Ga. The "FREESTYLE®" refrigerated beverage dispensing units can dispense over 125 brands without the need for extensive storage space.

There is now a desire to incorporate such micro-ingredient technology for behind the counter or crew serve applications in venues such as quick service restaurants and the like. The use of such micro-ingredient technology would allow the venue to offer dozens of different beverages without significant storage requirements in a fast and efficient manner.

SUMMARY OF THE INVENTION

The present application and the resultant patent thus provide an automated beverage dispenser using a number of cups and a number of lids. The automated beverage dispenser may include a lid stack with the number of lids, a lidding mechanism, and a positioning device for maneuvering the lidding mechanism so as to remove one of the number of lids from the lid stack and to attach the lid to one of the number of cups.

The present application and the resultant patent further provide a method of placing a lid on a cup in an automated beverage dispenser. The method may include the steps of maneuvering a lidding mechanism about a lid stack, lowering the lidding mechanism on to the lid stack until a contact switch is actuated by the lid, removing the lid from the lid stack, maneuvering the lidding mechanism about the cup, and lowering the lidding mechanism by a predetermined distance so as to place the lid on the cup.

The present application and the resultant patent further provide an automated beverage dispenser using a number of cups and a number of lids. The automated beverage dispenser may include a dispensing conveyor, a beverage dispensing station positioned along the conveyor, and a lidding station positioned along the dispensing conveyor. The lidding station may include a lidding mechanism and a positioning device such that the lidding mechanism attaches one of the number of lids to one of the number of cups as maneuvered by the positioning device.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 4 is a partial side view of an example of an ice dispensing station as may be described herein.

FIG. 5 is a top plan view of the ice dispensing station of FIG. 4 with portions of the cup lidding and removal station removed for clarity.

FIG. 6 is a partial perspective view of the ice dispensing station of FIG. 4.

FIG. 7 is a partial side cross-sectional view of the ice dispensing station of FIG. 4.

FIG. 8 is a chart showing beverage dispensing parameters as a function of foam level and the amount of ice.

FIG. 9 is a top plan view of an example of a cup lidding and removal station as may be described herein showing a lidding mechanism and a lid stack.

FIG. 10 is a partial side view of the cup lidding and removal station of FIG. 9.

FIG. 13 is a partial side cross-sectional view of a lidding mechanism of the cup lidding and removal station of FIG. 9 in use.

FIG. 14 is a partial side cross-sectional view of a lidding mechanism of the cup lidding and removal station of FIG. 9 in use.

FIG. 15 is a partial side cross-sectional view of a lidding mechanism of the cup lidding and removal station of FIG. 9 in use.

FIG. 16 is a partial side cross-sectional view of a lidding mechanism of the cup lidding and removal station of FIG. 9 in use.

FIG. 17 is a partial side cross-sectional view of a lidding mechanism of the cup lidding and removal station of FIG. 9 in use.

FIG. 18 is a top view of an example of a printing station as may be described herein with a printer head.

FIG. 19 is a side view of printing station of FIG. 18 with the printer head in use.

DETAILED DESCRIPTION

Figure 1:
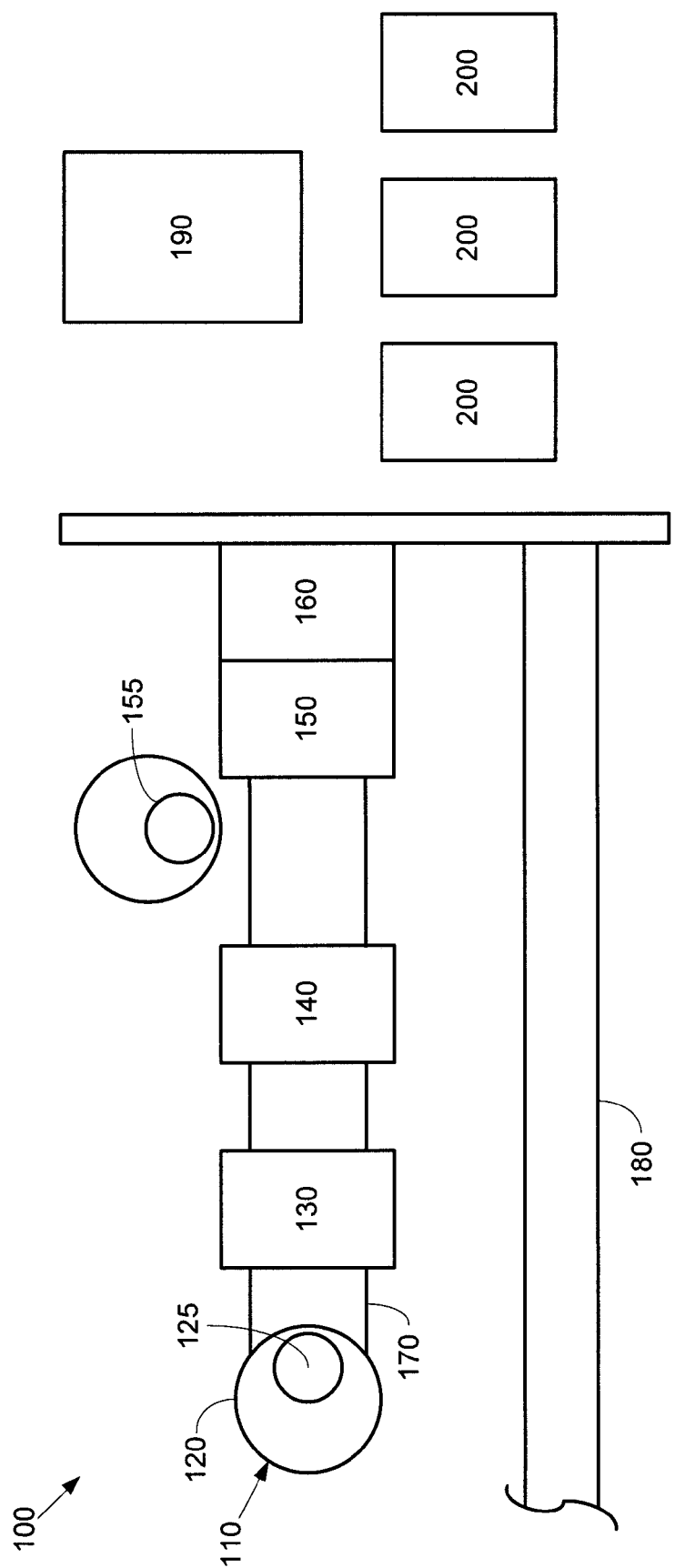
FIG. 1 is a schematic diagram of an example of a beverage dispensing system as may be described herein.
Figure 2:
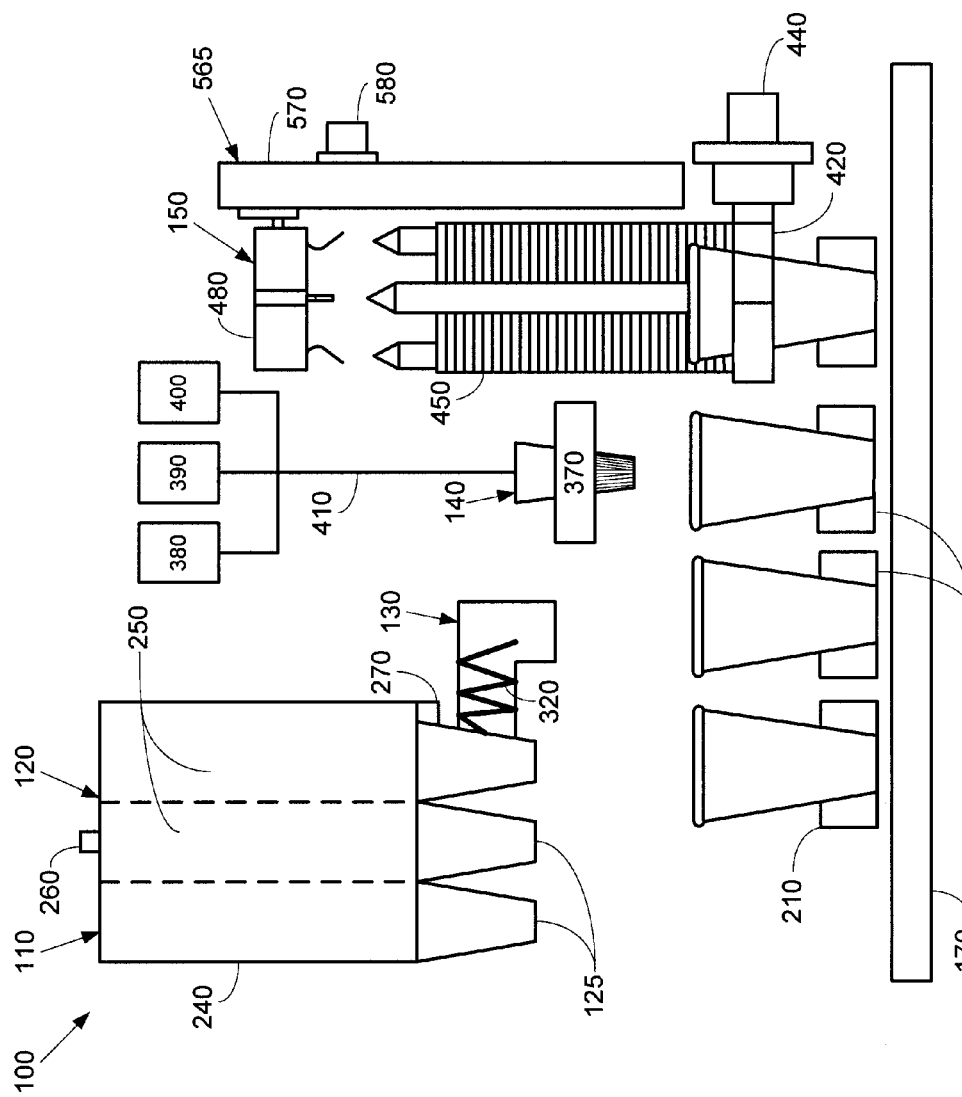
FIG. 2 is a side view of an example of the beverage dispensing system of FIG. 1.
Figure 3:
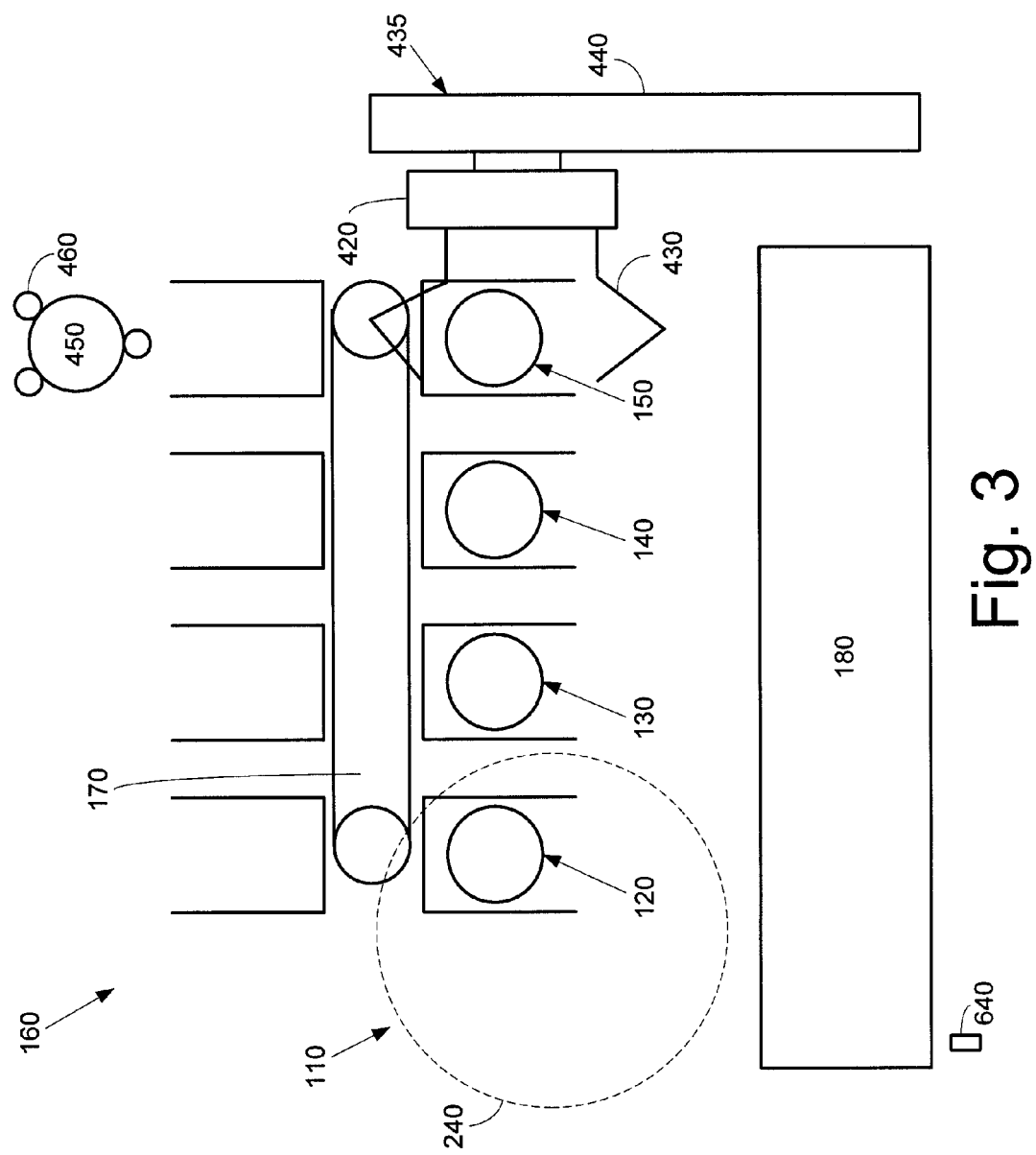
FIG. 3 is a top view of an example of the beverage dispensing system of FIG. 1 with portions of the cup lidding and removal station removed for clarity.

Referring now to the drawings, in which like numerals refer to like elements throughout the several views, FIGS. 1-3 show an example of a beverage dispensing system 100 as may be described herein. As will be described in more detail below, the overall beverage dispensing system 100 may include any number of modules or stations 110. These modules or stations 110 described herein need not all be used herein, need not all be used together, and need not all be used in any particular order. Additional stations 110 and other types of components in any configuration may be used herein.

Generally described, the beverage dispensing system 100 may include a cup placement station 120 with a number of cups 125, an ice dispensing station 130, a beverage dispensing station 140, a cup lidding and removal station 150 with a number of lids 155, and a printing station 160. Other stations 110 and other components may be used herein. Some or all of the stations 110 may be positioned about a dispensing conveyor 170. An outgoing staging conveyor 180 also may be used. Each of these stations 110 and the other components used herein may be in communications with a control device 190. The control device 190 may be a conventional microcomputer and the like capable of executing programmable commands. The control device 190 may be internal to or removed from the beverage dispensing system 100. The control device 190 may be responsive to instructions or requests from a number of input devices 200. The input devices 200 may be any type of user interface, such as conventional cash registers, order monitoring systems (bump screen), touch screen, and similar types of order input devices typically found in quick service restaurants and other types of retail establishments. Instructions or requests may be entered by a crew member, a consumer, or anyone else. Any number of input devices 200 may be used herein. Other components and other configurations may be used herein.

The cups 125 may be transported from station to station herein via the dispensing conveyor 170. The dispensing conveyor 170 may be a conventional timing belt or other types of transport devices. A number of cup holders 210 may be positioned on the dispensing conveyor 170. The cup holders 210 may include a number of walls 220 extending in a direction perpendicular to that of the advance of the dispensing conveyor 170. The walls 220 may be spaced apart so as to accommodate cups 125 of varying sizes. As will be described in more detail below, the walls 220 may have a number of slots 230 therein. Advancement of the dispensing conveyor 170 may be controlled by the control device 190. Multiple dispensing conveyors 170 may be used herein. Other components and other configurations may be used herein.

The cup placement station 120 may include a cup storage turret 240 or other type of cup storage device. The cup storage turret 240 may include a number of cup sleeves 250. The cup sleeves 250 may be sized for differently sized cups 125. Any number and any size of the cup sleeves 250 may be used herein with any number or any size of the cups 125. The cup sleeves 250 may rotate about a turret pin 260 in a conventional manner in communication with the control device 190. A release mechanism 270 may be positioned about the cup sleeves 250 so as to release an appropriately sized cup 125 into one of the cup holders 210 located in the cup placement station 120 on the dispensing conveyor 170 as instructed by the control device 190. Multiple cup storage turrets 240 may be used herein. Other components and other configurations may be used herein.

FIGS. 4-7 show an example of the ice dispensing station 130. The ice dispensing station 130 may be positioned on the dispensing conveyor 170 downstream of the cup placement station 120 or elsewhere. The ice dispensing station 130 may include an ice bin 280. The ice bin 280 may have any size, shape, or configuration. The ice bin 280 has a volume of ice 290 therein. The ice dispensing station 130 may include an ice chute 300 and an ice delivery tube 310. The ice chute 300 may connect the ice bin 280 and the ice delivery tube 310. The ice chute 300 may be angled downward so as to be gravity fed. The ice chute 300 may have any size, shape, or configuration. Alternatively, the ice delivery tube 310 may be attached directly to the ice bin 280. The ice delivery tube 310 may have a slight uphill slope so as to allow any water or condensate to drain and not drip into the cup 125. The ice delivery tube 310 may have any size, shape, or configuration. The ice delivery tube 310 may include an auger 320 therein. The auger 320 may be driven by an auger motor 330. The auger 320 may be a conventional screw type device and the like. The auger 320 may have any size, shape, or configuration. The auger motor 330 may be a conventional electrical motor and the like. Multiple ice delivery tubes 310 and augers 320 may be used herein.

The ice delivery tube 310 may extend over the dispensing conveyer 170 so as to dispense ice 290 into a cup 125 located in the cup dispensing station 130. The auger 320 drives the ice 290 through the ice delivery tube 310 and into the cup 225. The flow of ice 290 is controlled by the auger 320 and the auger motor 330 in communication with the control device 190. The amount of ice dispensed may be determined by a combination of the rotational rate of the auger 320 with respect to time. The control device 190 may have a look-up table or other types of data structures and associated software so as to provide a targeted, predetermined amount of the ice 290 for a given cup size. Moreover, modifications also may be requested, i.e., no ice, light ice, normal ice, or extra ice as directed by the input devices 200. The auger motor 330 may dynamically adjust the torque on the auger 320 so as to overcome ice jams and blockages therein while maintaining the correct rotational rate. The ice delivery tube 310 and the auger 320 may be removable for cleaning. Other components and other configurations may be used herein.

The ice dispensing station 130 also may include a weight sensor 335. In this example, the weight sensor 335 may be in the form of a load cell 340 although any type of weight sensor 335 may be used. The load cell 340 may be positioned about the dispensing conveyor 170 adjacent to the ice delivery tube 310. The load cell 340 may include a cup interface block 350 with a number of fins 360 extending therefrom. The fins 360 may extend upwardly into the dispensing conveyor 170. The fins 360 may be sized to accommodate the slots 230 in the walls 220 of the cup holders 210. As a cup holder 210 with an empty cup 125 moves into the ice dispensing station 130, the slots 230 slide through the fins 360 of the cup interface block 350. The fins 360 may slightly elevate the empty cup 125. The load cell 340 then may determine the tare weight of the empty cup 125. The load cell 340 subtracts the tare weight of the empty cup 125 as the ice 290 is dispensed therein. The load cell 340 may provide feedback to the control device 190 to ensure that an accurate predetermined volume of the ice 290 is dispensed therein for a given cup size. Likewise, the correct volume ensures that the ice 290 reaches a correct fill height within the cup 125. Other components and other configurations may be used herein.

FIGS. 2, 3, and 5 show an example of the beverage dispensing station 140. The dispensing station 140 may be positioned along the dispensing conveyer 170 adjacent to the ice dispensing station 130 or elsewhere. The beverage dispensing station 140 may be a beverage dispensing system such as that described in commonly owned U.S. Pat. No. 7,757,896 described above. The beverage dispensing station 140 may include a dispensing nozzle 370 for combining a number of micro-ingredients 380, a number of macro-ingredients 390, a diluent 400, and/or other ingredients. The micro-ingredients 380 generally have reconstitution ratios of about ten to one (10:1) and higher. Examples of the micro-ingredients 380 include natural and artificial flavors, flavor additives, natural and artificial colors, artificial sweeteners, additives for controlling tartness, functional additives, and the like. The macro-ingredients 390 generally have reconstitution ratios in the range of about three to one (3:1) to about six to one (6:1). The macro-ingredients 390 may include sugar, syrup, high fructose corn syrup, juice concentrates, and the like. Various types of these diluents may be used herein, including water, carbonated water, and other fluids.

The micro-ingredients 380, the macro-ingredients 390, and the diluents 400 may be mixed at the dispensing nozzle 370 or elsewhere. Example of suitable dispensing nozzles 370 include those described in commonly owned U.S. Pat. No. 7,866,509 B2 to Ziesel, entitled "DISPENSING NOZZLE ASSEMBLY" and commonly owned U.S. Pat. No. 7,578,415 B2 to Ziesel, et al., entitled "DISPENSING NOZZLE ASSEMBLY." U.S. Pat. Nos. 7,866,509 B2 and 7,578,415 B2 are incorporated herein by reference in full. Multiple dispensing nozzles 370 may be used herein. Conventional dispensing nozzles with conventional beverage ingredients also may be used herein. Other components and other configurations may be used herein.

The dispense of the beverage 410 from the dispensing nozzle 370 may be controlled by the control device 190. The timing of the dispense may vary with the nature of the beverage 410, the amount of the ice 290 within the cup 125, and other parameters. For example, the control device 190 may determine the target volume of the beverage 410 so as to provide the correct fill level. Specifically, the total volume of the cup contents equals the volume of the beverage plus the volume of ice. If the weight of the ice is known, the volume of the ice may be calculated for each cup size. The total volume of the beverage therein thus may be determined by subtracting the dispensed ice volume from the total target cup contents volume. For example, if at the end of the ice dispensing the load cell 340 detects that too much or too little ice has been dispensed into the cup 125, the control device 190 might adjust the amount of the beverage dispensed via an ice dispensing error amount signal to compensate for any inaccuracy in the ice amount to insure that the cup 125 is filled to the correct fill level, i.e., the adjusted target amount of the beverage 410. Other components and other configurations also may be used herein.

The dispense also may be momentarily paused one or more times so as to accommodate foaming of the beverage therein in the case of a carbonated beverage and the like and then resumed to provide the correct predetermined volume of the beverage therein without spillage. Different beverages 410 may have different foaming characteristics. For example, lemonade (a non-carbonated beverage) may have no foam, a carbonated diet soft drink may have a medium level of foam, and a carbonated soft drink with flavoring may have an extreme level of foam. The same beverage 470 also may foam differently depending on how much ice 290 is in the cup 125. The more ice 290 in the cup 125, the less foam may be created. Cup size also may affect the dispensing parameters. A larger cup 125 with a larger volume of beverage 470 may generate a larger volume of foam as compared to a similar beverage in a smaller cup 125 and may thus require a longer wait time for foam dissipation. A non-foaming beverage such as a lemonade thus may be dispensed in one continuous pour. A medium foaming beverage may be dispensed with an initial partial pour, a wait time for the foam to dissipate, then a final top-off. An extreme foaming beverage may need to be dispensed in three or more pours with a longer wait times in between each pour to allow the foam to dissipate. An extreme foaming beverage also may require time to allow the foam to dissipate after the final top-off before moving the cup 125.

Each beverage 410 may be characterized by the level of foam generated such that the beverage dispensing parameters may be set according to the foam level of the beverage 410, the level of ice 290 in the cup 125, and the size of the cup 125. Beverage dispensing parameters may include but are not limited to: (1) the number of pours; (2) the percent of the volume of the cup 125 filled by the initial pour; (3) waiting time between pours; (4) and waiting time after the last pour before the cup begins moving. Other parameters may be used herein. By setting the beverage parameters properly, a beverage 410 may be poured in a minimum amount of time without foaming-over.

Specifically, each beverage 410 may be assigned a level of foaming. Any number of levels of foaming may be created. For the purposes of example six (6) levels of foaming may be used from "1": non-foaming, to "6": extreme-foaming. The level of foaming may be included in a master recipe data base in the control device 190. FIG. 8 shows a two dimensional table with a number of beverage dispensing parameters 415 assigned for each level of foaming for four different levels of ice. Such a table may be included in the software/database of the control device 190. By way of example, if carbonated diet soft drink has a foam level of 3, then according to the table, if medium ice is selected, then the beverage dispensing parameters will be as follows: (1) the cup 125 will be filled in two pours; (2) the initial pour will fill about 81% of the cup 125; (3) there will be a 4.5 second pause between the initial pour and the top-off; (4) there will be no wait after the top-off before the cup 125 starts moving. This example shows a two dimensional table that would apply to all cup sizes, but a third dimension could be added to the table to adjust for cup size.

FIGS. 9-17 show an example of the cup lidding and removal station 150. The cup lidding and removal station 150 may be positioned along the dispensing conveyor 170 adjacent to the beverage dispensing station 140 or elsewhere. The cup lidding and removal station 150 may include a gripper mechanism 420. The gripper mechanism 420 may include a number of gripper jaws 430 that may open and close so as to accept, center, and release the cup 125. The gripper jaws 430 may accommodate cups 125 of differing sizes. The gripper mechanism 420 may be positioned about the dispensing conveyor 170 with the gripper jaws 430 positioned above the height of the walls 220 of the cup holder 210 so as to grip the cup 125 therein. The gripper mechanism 420 may be mounted onto a gripper positioning device 435. In this example, the gripper positioning device 435 may be in the form of a first horizontal linear actuator 440 and the like. The first horizontal linear actuator 440 may be any type of device that provides substantially horizontal movement. The first horizontal linear actuator 440 may move the gripper mechanism 420 with the cup 125 therein from the dispensing conveyor 170 to the staging conveyor 180 or elsewhere. Other components and other configurations may be used herein.

The cup lidding and removal station 150 also may include one or more lid stacks 450. The lid stacks 450 may have a stack of the lids 155 therein. The lid stacks 450 may include a number of posts 460 to support the lids 155 therein while providing access thereto. Although three (3) posts 460 are shown, any number of the posts 460 may be used. The lid stack 460 also may include one or more springs 470 positioned underneath the lids 155. The springs 470 may allow a reasonable degree of over travel. Any number of the lid stacks 450 may be used. Specifically, the lid stacks 450 with differently sized lids 155 may be positioned adjacent to each other. Other components and other configurations may be used herein.

The cup lidding and removal station 150 may include a lidding mechanism 480. The lidding mechanism 480 may include a base 490 with a number of spring clips lid retention members 495 extending therefrom. In this example, the lid retention members 495 may be in the form of a number of spring clips 500. Each of the spring clips 500 may include a base portion 510, a narrowing attachment portion 520, and an expanding centering portion 530. The spring clips 500 may be made out of any type of flexible material with a sufficient amount of memory so as to resist permanent deformation while accommodating lids 155 of differing sizes. Any number of the spring clips 500 may be used herein. The spring clips 500 may be adapted for use with lids 155 having a top portion 540 and an indented bottom portion 550. Other shapes and other types of lid retention members 495 may be used herein. A proximity switch 555 and the like may be positioned about the base 490 between the spring clips 500. The proximity switch 555 may be in the form of a contact switch 560. The contact switch 560 may be in communication with the control device 190. Other components and other configurations may be used herein.

The cup lidding and removal station 150 also includes a positioning device 565 for maneuvering the lidding mechanism 480. The positioning device 565 may include a vertical linear actuator 570 and a second horizontal linear actuator 580. The actuators 570, 580 may be in communication with the lidding mechanism 480. The actuators 570, 580 may be any type of movement device that provides substantially vertical and/or horizontal motion. The base 490 of the lidding mechanism 480 may be attached to the vertical linear actuator 570 for vertical motion while the vertical linear actuator 570 may be attached to the second horizontal liner actuator 580 for horizontal motion. The second horizontal linear actuator 580 may be positioned above the first horizontal linear actuator 440. Other components and other configurations may be used herein.

Figure 12:
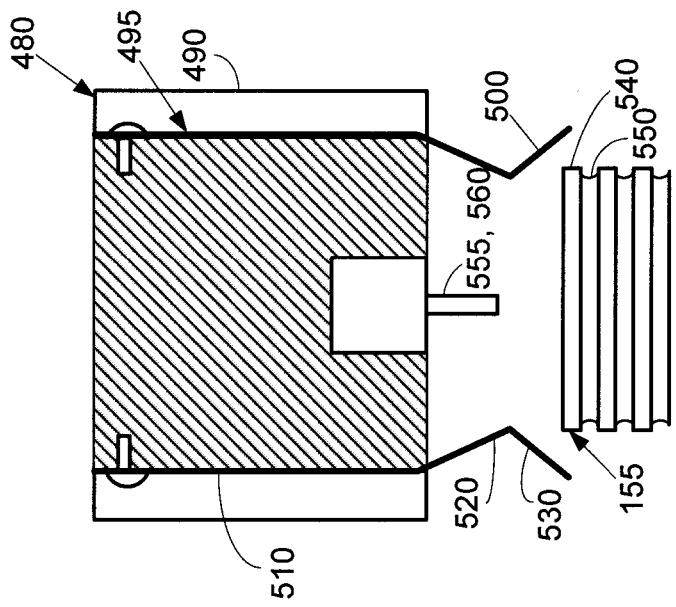
FIG. 12 is a partial side cross-sectional view of a lidding mechanism of the cup lidding and removal station of FIG. 9 in use.
Figure 11:
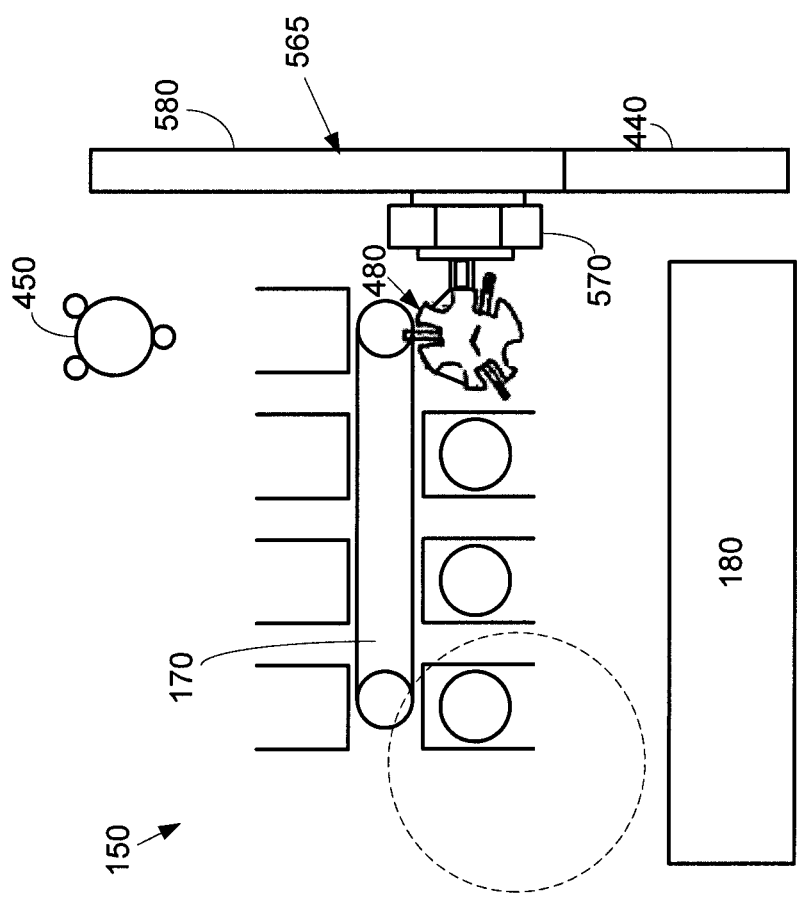
FIG. 11 is a further top plan view of the cup lidding and removal station of FIG. 8.

When the dispensing conveyor 170 delivers a full cup 125 to the gripper mechanism 420, the gripper jaws 430 engage and center the cup 125 therein with respect to the cup lidding mechanism 480. At any point in the dispensing process, the lidding mechanism 480 may be maneuvered by the second horizontal linear actuator 580 and the vertical linear actuator 570 to the lid stack 450 with the appropriately sized lids 155 therein. As is shown in FIGS. 12-14, the vertical linear actuator 570 then lowers the lidding mechanism 480 onto the stack of the lids 155. Because the spring clips 500 of the lidding mechanism 480 are flexible, the spring clips 500 may flex outwardly so as to accommodate differently sized lids 155. As the lidding mechanism 480 is lowered, the centering portions 530 of the spring clips 500 expand over the top lid 155. The attachment portion 520 then snaps into place about the indented portion 550 of the lid 155. Continued downward motion of the lidding mechanism 480 actuates the contact switch 560 positioned in the base 490. Actuation of the contact switch 520 causes the downward motion of the vertical linear actuator 570 to cease. The vertical linear actuator 570 then reverses direction and lifts the lid 155 out of the lid stack 450. If the lid 155 is not successfully engaged, the contact switch 560 will de-actuate as the lidding mechanism 480 moves upward. The lidding mechanism 480 then may again attempt the engagement sequence.

If the lid 155 is successfully engaged as indicated by continued actuation of the contact switch 560, the vertical linear actuator 570 and the second horizontal linear actuator 580 of the positioning device 565 may maneuver the lidding mechanism 480 over the cup 125 within the gripper mechanism 420. FIGS. 15-17 show the positioning of the lid 155 on the cup 125 by the lidding mechanism 480. The vertical linear actuator 570 may lower the lidding mechanism 480 with the lid 155 onto the cup 125. The base 490 of the lidding mechanism 480 applies a force directly to the lid 155 to snap it onto the cup 125. The extent of the downward movement of the lidding mechanism 480 may be dependent upon the size of the cup 125. The vertical linear actuator 570 may move the lidding mechanism 480 to differing predetermined heights depending upon the size of the cup 125. The retention snap force between the cup 125 and the lid 155 may be higher than that between the spring clips 500 and the lid 155 such that when the lidding mechanism 480 is again raised by the vertical linear actuator 570, the spring clips 500 may be pulled off the lid 155. The de-actuation of the contact switch 560 indicates that the lid 155 has been successfully snapped onto the cup 125. If the contact switch 560 remains actuated, the lidding mechanism 480 may again attempt to attach the lid 155 to the cup 125.

Once the lidding mechanism 480 is clear of the cup 125, the first horizontal linear actuator 440 may move the gripper mechanism 420 with the cup 125 to the staging conveyor 180. The gripper jaws 430 of the gripper mechanism 420 may release the cup 125 such that the cup 125 may move out of the gripper jaws 430 as the staging conveyor 180 advances. A number of dispensed, lidded, and identified beverages may be stored on the staging conveyor 180 for order fulfillment. The staging conveyor 180 may advance by one cup pitch each time a finished beverage is delivered to the staging conveyor 180 so as to efficiently space the staged beverages. The staging conveyor 180 may advance by more than one cup pitch to create a relatively larger space between cups 125 to segregate cups 125 from one customer order to cups 125 from a subsequent order. There may be a sensor 640 at the far end of the staging conveyor 180 to detect when the staging conveyor 180 is full to prevent cups 125 from falling off of the end of the staging conveyor 180. The overall cycle then may be repeated. Other components and other configurations may be used herein.

FIGS. 18-21 show an example of the printing station 160. The printing station 160 may include one or more printing heads 590. The printing head 590 may be an ink jet printer and the like. Any type of printing mechanism adequate for quickly printing on a thermoplastic lid or other type of lid material without significant smudging may be used herein. Moreover, the printing head 590 also may apply labels and the like. The printing head 590 may be attached to the lidding mechanism 480 of the cup lidding and removal station 150. The printing head 590 may be attached to the lidding mechanism 480 by a pair of standoffs 600 and the like. Any type of substantially rigid attachment means may be used herein. The printing head 590 may be positioned even with or slightly beneath the bottom of the lidding mechanism 480. Other components and other configurations may be used herein.

After the lidding mechanism 480 attaches the lid 155 to the cup 125 as described above, the vertical linear actuator 570 raises the lidding mechanism 480 to a predetermined height so as to accommodate the printing head 590. As the first horizontal linear actuator 440 and the gripper mechanism 420 move the cup 125 towards the staging conveyor 180, the lid 155 may pass underneath the printing head 590. The printing head 590 then prints one or more messages 610 thereon. The message 610 may include a brand or other beverage identifier 620 and an order number 625. The message 610 also may include any type of information such as an advertisement, refill information, nutritional information, a coupon, a prize, and the like. Any type of information, designs, or other indicia may be printed thereon.

Although the printing head 590 has been described in terms of being positioned about the lidding mechanism 480, the printing head 590 may be positioned anywhere along the travel path of the lid 155. Further, the printing head 590 also may be positioned so as to print the message 610 on the side or even the bottom of the cup 125. Multiple printing heads 590 may be used herein. Other components and other configurations may be used herein.

The various stations 110 of beverage dispensing system 100 located about the dispensing conveyor 170 and the staging conveyor 180 may be located above a drain pan 650 so that drips and spills may be appropriately routed to a drain 660. The staging conveyor 170 and the dispensing conveyor 180 may be mounted to a deck 670 so as to be removable for cleaning. Moreover, a motor 680 powering the dispensing conveyor 170 may be located above the deck 670 so that drips and spills will not land on the motor 680. The disengagement of the motor 680 from the staging conveyor 170 may be a simple, passive process when the deck 670 is removed for cleaning.

Figure 22:
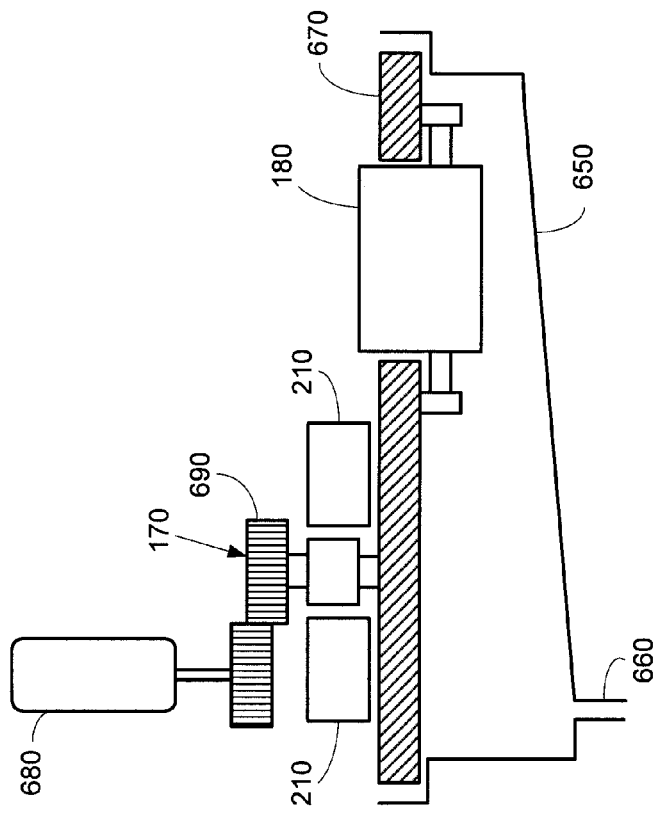
FIG. 22 is a partial side cross-section view of the dispensing conveyor and the staging conveyor of the beverage dispensing system positioned about a drain pan.
Figure 20:
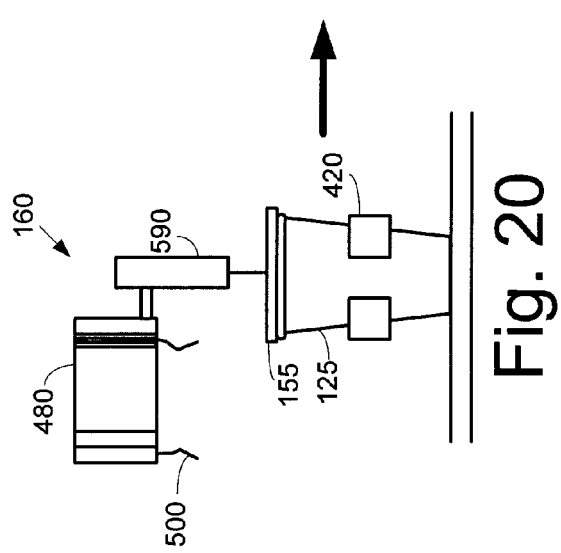
FIG. 20 is a side view of printing station of FIG. 18 with the printer head in use.
Figure 21:
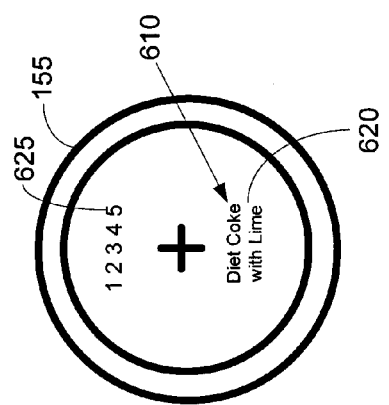
FIG. 21 is a top view of a lid as may be described herein with identification indicia printed thereon.

FIG. 22 shows the deck 670 to which the staging conveyor 180 and the dispensing conveyor 170 may be attached and located over the drain pan 650. The motor 680 of the dispensing conveyor 170 may be mounted above the deck 670 and connected to the dispensing conveyor 170 via a number of gears 690. The gears 690 may be disengaged by themselves when the deck 670 is removed for cleaning by tilting the deck 670 up and sliding it out. Other components and other configurations may be used herein.

Figure 23:
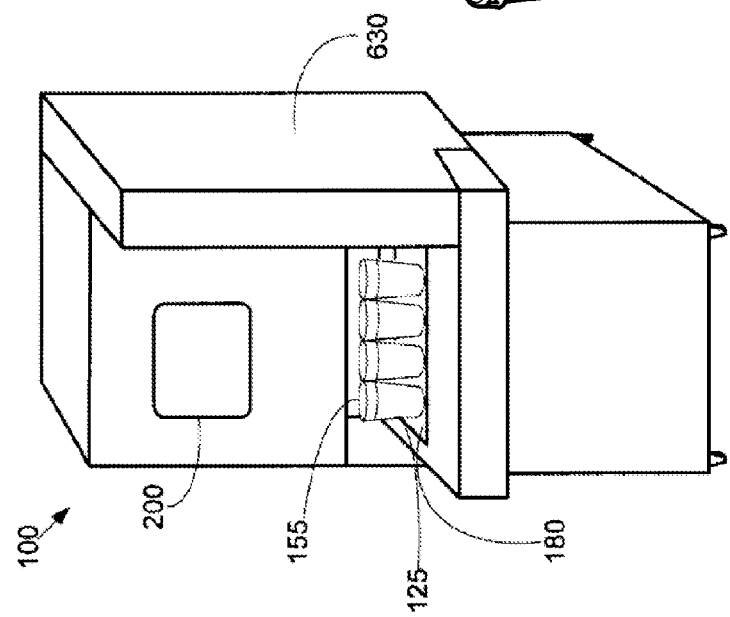
FIG. 23 is a perspective view of an example of an alternative embodiment of a beverage dispensing system as may be described herein.

Although the beverage dispensing system 100 has been described in the context of a behind the counter or a crew serve environment, the beverage dispensing system 100 also may be used in a freestanding or customer serve mode. For example, FIG. 23 shows the beverage dispensing system 100 positioned within an outer frame 630. Any or all of the stations 110 may be positioned within the frame 630 and out of direct contact with a consumer. Rather, the consumer may have access to the input device 200 and the staging conveyor 190. The consumer thus requests a beverage at the input device 200. The cup 125 with ice 290 and a beverage 410 therein and the lid 155 thereon, then may be dispense along the staging conveyor 180. The lid 155 likewise may have the message 610 thereon. Other components and other configurations also may be used herein.

The beverage dispensing system 100 thus automates the beverage dispensing process. In response to a request for a beverage at the input device 200, the cup placement station 120 selects the appropriately sized cup 125 and places the cup 125 within the cup holder 210 of the dispensing conveyor 170. The dispensing conveyer 170 advances the cup 125 to the ice dispensing station 130. The ice dispensing station 130 dispenses the appropriate predetermined volume of ice 290 therein via feedback from the load cell 340. The dispensing conveyor 170 then advances the cup 126 to the dispensing nozzle 370. The dispensing nozzle 370 fills the cup 125 with the appropriate predetermined volume of the desired beverage 410. The controller 190 also may adjust the amount of the beverage dispensed to compensate for any inaccuracies in the dispensed ice as detected by the load cell 340 so that the proper fill level in the cup 125 may be achieved. The beverage dispensing station 140 may pause during the dispense so as to accommodate foaming. The dispensing conveyor 170 may maneuver the cup 125 to the cup lidding and removal station 150. The gripper mechanism 420 may grab and center the cup 125. The lidding mechanism 480 may be maneuvered by the vertical linear actuator 570 and the second horizontal linear actuator 580 of the positioning device 565 to select and remove the appropriately sized lid 155 from one of the lid stacks 450. The lidding mechanism 480 may be maneuvered so as to attach the lid 155 to the cup 125. The lidding mechanism 480 then may be raised and the cup 125 may begin to maneuver towards the staging conveyor 180 via the first horizontal linear actuator 440. While doing so, the cup 125 passes under the printing head 590 of the printing station 160 such that a message 610 may be printed on the lid 155 or elsewhere.

As described above, the various stations 110 of the beverage dispensing system 100 need not all be used herein together. Likewise, additional stations and additional components also may be used herein. Components may be substituted for other known components that may carry out the function of the components described herein. The beverage dispensing system 100 thus provides a lidded and identified beverage in a fast and efficient manner. Given the high volume of beverages and the large variety that may be produced herein, the use of the brand identifier 620 is helpful to ensure that the consumer receives the correct beverage—particularly with beverages of a similar color. The beverage dispensing system 100 also ensures that the correct amount of ice 290 is added to the beverage 410 so as to limit premature melting with too little ice or an inadequate volume of the beverage 410 therein with too much ice. Other types of additives or other types of ingredients in liquid, solid, or gaseous form also may be added to the cup 125 in additional stations 110. Multiple beverage dispensing systems 100 also may be used herein and may share certain stations 110 or other components.

Figure 24A:
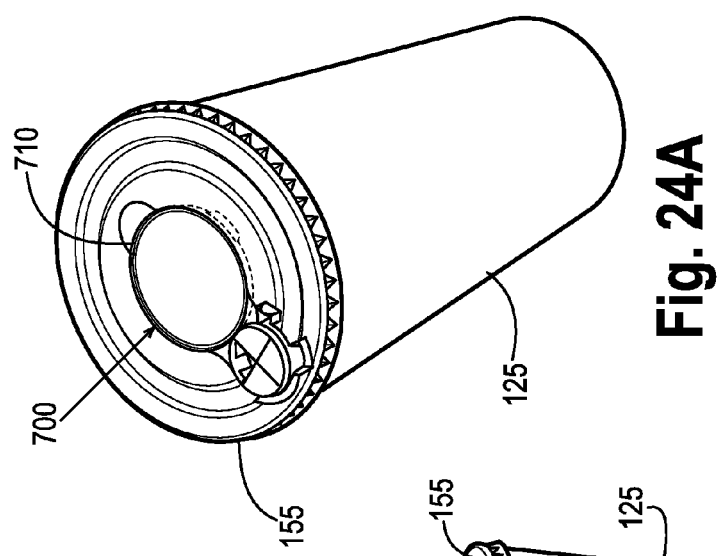
FIGS. 24A-24C show perspective view of lids with tokens as may be described herein.
Figure 24B:
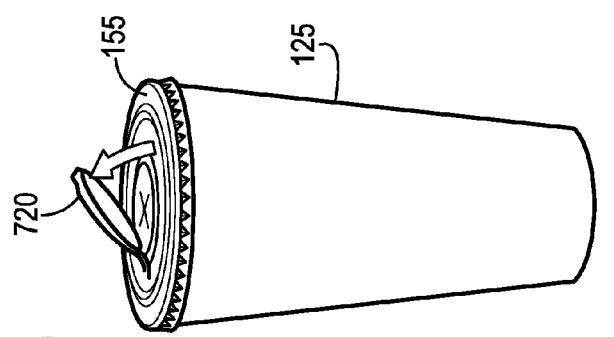
Figure 24C:
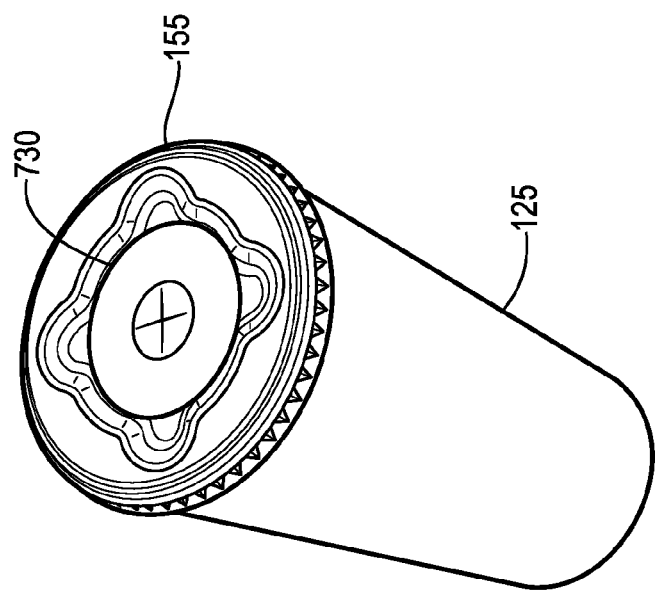

As is described above, the message 610 may include the brand or other type of beverage identifier 620 and the order number 625. The message 610 also may include any type of information such as an advertisement, refill information, nutritional information, a coupon, a prize, and the like. As is shown in FIGS. 24A-24C, the lid 155 also may include a token 700 thereon. The token 700 may be a circular token 710 as is shown in FIG. 24A, a tear out token 720 as is shown in FIG. 24B, or a doughnut token 730 as is shown in FIG. 24C. The tokens 700 may have any size, shape, or configuration. The token 700 may provide a substrate on the lid 155 for preventing or reducing smudging of the ink as compared to printing directly on the lid 155. Printing on the token 700 also may enable tie-ins with loyalty programs and the like. For example, a loyalty program code may be printed on the token 700. A consumer may take that token 700, log in to the website of the loyalty program, and enter the code on the token 700 to earn loyalty points and the like. Other types of promotions may be used herein.

Figure 25:
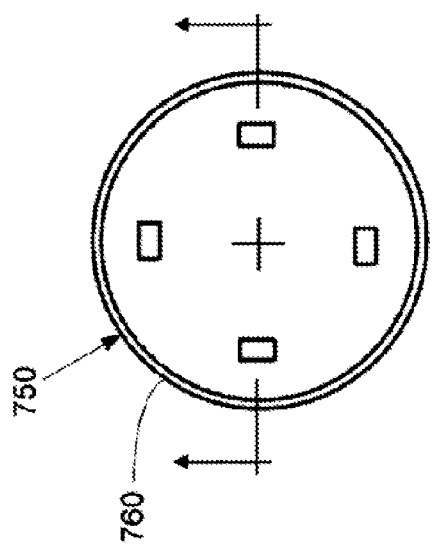
FIG. 25 is a plan view of a lid as may be described herein.
Figure 26:
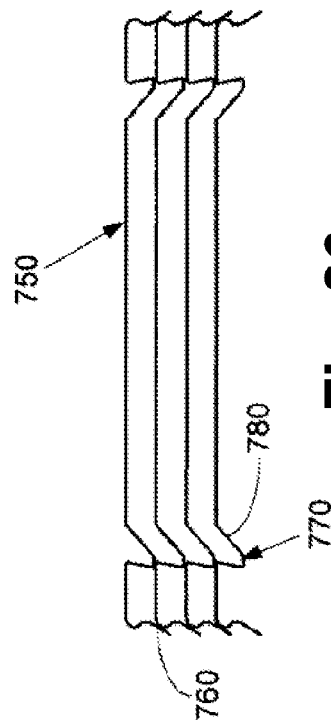
FIG. 26 is a side plan view of a stack of the lids of FIG. 25.

Different type of lids 155 also may be used with the beverage dispensing system 100. For example, FIGS. 25 and 26 show a lid 750. This lid 750 may have an angled lead-in flair 760 extending about the perimeter. The angled lead-in flair 760 may be continuous or intermittent. The angled lead-in flair 760 may allow the lid 750 to find it way on to the cup 125 even if the lid 750 is somewhat off center so as to increase overall lidding tolerances and reliability.

The lid 750 also may include a number of anti-nesting features 770. The anti-nesting features 770 may include a number of undercuts 780 formed into the lid 750 about the angled lead-in flair 760. Although four (4) undercuts 780 are shown, any number may be used herein. The undercuts 780 may have a sufficient depth to resist nesting but shallow enough to allow the lid 750 to escape from a typical vacuum form mold. The overall vertical lid pitch may remain the same. The undercuts 780 allow the lids 750 to be stacked in any order without nesting. The lids 750 may be positioned on the cup 125 as is described above or the lids 750 may be used with a bottom mounted escapement type lid drop mechanism and the like. Linear or rotary devices may be used. Other components and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An automated beverage dispenser using a number of cups and a number of lids, comprising:
    a lid stack with the number of lids;
    a lidding mechanism; and
    a positioning device for maneuvering the lidding mechanism so as to remove one of the number of lids from the lid stack and to attach the lid to one of the number of cups;
    wherein the positioning device comprises a vertical actuator and/or a horizontal actuator.

2. The automated beverage dispenser of claim 1, wherein the lidding mechanism comprises a base with a plurality of lid attachment members.

3. The automated beverage dispenser of claim 2, wherein the plurality of lid attachment members comprises a plurality of spring clips.

4. The automated beverage dispenser of claim 2, wherein the plurality of lid retention members comprises a narrowing attachment portion and an expanding centering portion.

5. The automated beverage dispenser of claim 2, wherein the base comprises a proximity switch thereon.

6. The automated beverage dispenser of claim 1, further comprising a gripper mechanism to position one of the number of cups therein.

7. The automated beverage dispenser of claim 6, wherein the gripper mechanism comprises a plurality of gripper jaws.

8. The automated beverage dispenser of claim 6, further comprising a positioning device to maneuver the gripper mechanism.

9. The automated beverage dispenser of claim 8, wherein the positioning device comprises a linear actuator.

10. The automated beverage dispenser of claim 1, wherein the lid stack comprises one or more springs therein.

11. The automated beverage dispenser of claim 1, further comprising a printing head positioned about the lidding mechanism.

12. The automated beverage dispenser of claim 11, wherein the printing head prints a message on the lid.

13. The automated beverage dispenser of claim 11, wherein the printing head prints a message on a token on the lid.

14. The automated beverage dispenser of claim 12, wherein the message comprises a brand identifier.

15. The automated beverage dispenser of claim 12, wherein the message comprises an order identifier.

16. The automated beverage dispenser of claim 1, further comprising a dispensing conveyor positioned about the lidding mechanism.

17. The automated beverage dispensing system of claim 16, wherein the dispensing conveyor is removably positioned about a drain pan.

18. The automated beverage dispenser of claim 1, further comprising a dispensing nozzle positioned about the dispensing conveyor and wherein the dispensing nozzle dispenses a number of micro-ingredients therethrough.

19. The automated beverage dispenser of claim 1, further comprising a control device and wherein the control device comprises a number of beverage dispensing parameters therein.

20. A method of placing a lid on a cup in an automated beverage dispenser, comprising:
    maneuvering a lidding mechanism about a lid stack;
    lowering the lidding mechanism on to the lid stack until a contact switch is actuated by the lid;
    removing the lid from the lid stack;
    maneuvering the lidding mechanism about the cup; and
    lowering the lidding mechanism by a predetermined distance so as to place the lid on the cup.

21. The method of claim 20, further comprising the step of lifting the lidding mechanism off of the cup and determining that the lid has been removed by the de-actuation of the contact switch.

22. An automated beverage dispenser using a number of cups and a number of lids, comprising:
    a dispensing conveyor;
    a beverage dispensing station positioned along the conveyor; and
    a lidding station positioned along the dispensing conveyor;
    the lidding station comprising a lidding mechanism and a positioning device such that the lidding mechanism attaches one of the number of lids to one of the number of cups as maneuvered by the positioning device;
    wherein the positioning device comprises a vertical actuator and/or a horizontal actuator.

23. An automated beverage dispenser using a number of cups and a number of lids, comprising:

a lid stack with the number of lids;
a lidding mechanism; and
a positioning device for maneuvering the lidding mechanism so as to remove one of the number of lids from the lid stack and to attach the lid to one of the number of cups;
wherein the lidding mechanism comprises a base with a plurality of lid attachment members;
wherein the base comprises a proximity switch thereon; and
wherein the proximity switch comprises a contact switch.

* * * * *